(12) United States Patent
Katori et al.

(10) Patent No.: US 11,739,844 B2
(45) Date of Patent: Aug. 29, 2023

(54) MECHANICAL SEAL

(71) Applicant: EAGLE INDUSTRY CO., LTD., Tokyo (JP)

(72) Inventors: Hikaru Katori, Tokyo (JP); Keiichi Chiba, Tokyo (JP); Masatoshi Itadani, Tokyo (JP); Tadahiro Kimura, Tokyo (JP); Akira Yoshino, Tokyo (JP)

(73) Assignee: EAGLE INDUSTRY CO., LTD.

( * ) Notice: Subject to any disclaimer, the term of this patent is extended or adjusted under 35 U.S.C. 154(b) by 230 days.

(21) Appl. No.: 16/331,377

(22) PCT Filed: Sep. 7, 2017

(86) PCT No.: PCT/JP2017/032182
§ 371 (c)(1),
(2) Date: Mar. 7, 2019

(87) PCT Pub. No.: WO2018/051867
PCT Pub. Date: Mar. 22, 2018

(65) Prior Publication Data
US 2019/0203840 A1 Jul. 4, 2019

(30) Foreign Application Priority Data

Sep. 14, 2016 (JP) .................. 2016-179060

(51) Int. Cl.
*F16J 15/34* (2006.01)
*F04D 29/12* (2006.01)

(52) U.S. Cl.
CPC ........... *F16J 15/3404* (2013.01); *F16J 15/34* (2013.01); *F16J 15/3452* (2013.01);
(Continued)

(58) Field of Classification Search
CPC .. F16J 15/342; F16J 15/08; F16J 15/34; F16J 15/40; F16J 15/3404; F16J 15/3452; F16J 15/3464; F04D 29/122; F05B 2240/57
See application file for complete search history.

(56) References Cited

U.S. PATENT DOCUMENTS

| 2,937,039 A | 5/1960 | Santapa | ................. F16J 15/348 |
| 3,232,680 A * | 2/1966 | Clark | ..................... F16C 17/10 |
| | | | 384/110 |

(Continued)

FOREIGN PATENT DOCUMENTS

| EP | 3284981 A1 * | 2/2018 | ............... F16J 15/34 |
| GB | 850296 | 10/1960 | ............... F16J 15/38 |

(Continued)

OTHER PUBLICATIONS

U.S. Appl. No. 16/331,377, filed Mar. 7, 2019, Katori.
(Continued)

*Primary Examiner* — Eugene G Byrd
(74) *Attorney, Agent, or Firm* — HAYES SOLOWAY P.C.

(57) ABSTRACT

Two conflicting functions of sealing and lubrication of sliding faces are achieved for a long time. The sliding face of a rotating-side seal ring 3 is provided with dynamic pressure generation grooves 11 configured to communicate with the circumferential edge on the inner peripheral side of the sliding face and not to communicate with the circumferential edge on the outer peripheral side. A spring 7 is provided on the back side of a stationary-side seal ring 6 for pressing the stationary-side seal ring 6 against the sliding face of the rotating-side seal ring 3. A spring holder 8 is provided between the back side of the stationary-side seal ring 6 and the spring 7.

3 Claims, 8 Drawing Sheets

(52) U.S. Cl.
CPC ......... *F16J 15/3464* (2013.01); *F04D 29/122* (2013.01); *F05B 2240/57* (2013.01)

(56) References Cited

U.S. PATENT DOCUMENTS

| | | | | |
|---|---|---|---|---|
| 3,410,565 | A * | 11/1968 | Williams | F16J 15/42 |
| | | | | 277/348 |
| 3,515,393 | A | 6/1970 | Metcalfe | F16J 15/36 |
| 3,675,935 | A | 7/1972 | Ludwig | F16J 15/345 |
| 3,695,789 | A * | 10/1972 | Jansson | F01C 21/003 |
| | | | | 418/75 |
| 3,782,737 | A | 1/1974 | Ludwig | F16J 15/342 |
| 3,806,136 | A | 4/1974 | Warner | |
| 3,923,950 | A | 12/1975 | Gump et al. | 277/70 |
| 4,082,296 | A | 4/1978 | Stein | F16J 15/441 |
| 4,406,466 | A * | 9/1983 | Geary, Jr. | F16J 15/3412 |
| | | | | 277/347 |
| 4,504,069 | A | 3/1985 | Stenlund | F16J 15/441 |
| 5,199,719 | A | 4/1993 | Heinrich | F16J 15/36 |
| 5,316,455 | A * | 5/1994 | Yoshimura | F04C 29/028 |
| | | | | 418/63 |
| 5,527,045 | A | 6/1996 | Pondelick | F16J 15/441 |
| 5,529,317 | A * | 6/1996 | Muller | F16J 15/3404 |
| | | | | 277/400 |
| 5,556,111 | A | 9/1996 | Sedy | |
| 5,692,756 | A | 12/1997 | Altieri | F16J 15/3464 |
| 5,702,110 | A | 12/1997 | Sedy | F16J 15/34 |
| 5,899,460 | A | 5/1999 | Altieri | F16J 15/3496 |
| 5,984,312 | A | 11/1999 | Hintenlang | F16J 15/36 |
| 6,325,380 | B1 * | 12/2001 | Feigl | F01D 25/168 |
| | | | | 277/352 |
| 6,805,357 | B2 | 10/2004 | Dahlheimer | F16J 15/3468 |
| 7,984,919 | B2 | 7/2011 | Nitsche | B62D 25/088 |
| 8,759,692 | B2 | 6/2014 | Bunyan | H02G 13/00 |
| 8,766,108 | B2 | 7/2014 | Bunyan | H02G 13/00 |
| 9,482,274 | B2 | 11/2016 | Ertas | F16C 32/0677 |
| 9,964,215 | B2 | 5/2018 | Itadani | |
| 10,054,230 | B2 | 8/2018 | Katori | F16J 15/3416 |
| 10,337,560 | B2 | 7/2019 | Tokunaga | F16J 15/348 |
| 10,337,620 | B2 | 7/2019 | Tokunaga | F16K 15/3412 |
| 10,473,220 | B2 | 11/2019 | Tokunaga | F16C 33/107 |
| 10,598,286 | B2 | 3/2020 | Tokunaga | F16J 15/3412 |
| 10,612,665 | B2 | 4/2020 | Tokunaga | F16J 15/3412 |
| 10,704,417 | B2 | 7/2020 | Tokunaga | F16J 15/3416 |
| 10,753,476 | B2 * | 8/2020 | FitzGibbon | F16J 15/342 |
| 11,009,072 | B2 | 5/2021 | Kimura | F16J 15/3412 |
| 2003/0006560 | A1 | 1/2003 | Dahlheimer | F16J 15/34 |
| 2004/0232622 | A1 * | 11/2004 | Gozdawa | F16J 15/342 |
| | | | | 277/401 |
| 2007/0122269 | A1 | 5/2007 | Meier | F01D 25/24 |
| 2007/0248452 | A1 | 10/2007 | Brisson | F01D 25/24 |
| 2008/0036154 | A1 | 2/2008 | Okamoto | F16J 15/3412 |
| 2009/0008881 | A1 | 1/2009 | Lee | F16J 15/445 |
| 2010/0158674 | A1 | 6/2010 | Turnquist | F16J 15/445 |
| 2012/0027582 | A1 | 2/2012 | Matarajan | F16J 15/445 |
| 2013/0209011 | A1 * | 8/2013 | Tokunaga | F16C 33/74 |
| | | | | 384/123 |
| 2014/0167362 | A1 * | 6/2014 | Hosoe | F16J 15/3412 |
| | | | | 277/400 |
| 2014/0217676 | A1 * | 8/2014 | Hosoe | F16J 15/34 |
| | | | | 277/350 |
| 2014/0312574 | A1 | 10/2014 | Busby | F16J 15/14 |
| 2016/0024951 | A1 | 1/2016 | Sarawate | F16J 15/02 |
| 2016/0033043 | A1 | 2/2016 | Busby | B64C 1/36 |
| 2016/0131259 | A1 | 5/2016 | Boyd | B64C 1/14 |
| 2016/0146248 | A1 | 5/2016 | Ertas | F16C 32/0677 |
| 2016/0230892 | A1 * | 8/2016 | Yoshino | F16J 15/348 |
| 2017/0211406 | A1 | 7/2017 | Peters | F03B 3/12 |
| 2017/0370239 | A1 | 12/2017 | Venkataramani | F01D 25/005 |
| 2018/0073394 | A1 | 3/2018 | Tokunaga | F02C 7/06 |
| 2018/0128377 | A1 | 5/2018 | Tokunaga | F16J 15/34 |
| 2018/0128378 | A1 * | 5/2018 | Tokunaga | F16J 15/3412 |
| 2018/0135699 | A1 | 5/2018 | Tokunaga | F16C 33/80 |
| 2018/0172162 | A1 | 6/2018 | Tokunaga | F16J 15/3412 |
| 2018/0306327 | A1 | 10/2018 | Itadani | F16J 15/34 |
| 2019/0112026 | A1 | 4/2019 | Boyd | F16J 15/104 |
| 2019/0203840 | A1 | 7/2019 | Katori | F16J 15/342 |
| 2019/0376558 | A1 | 12/2019 | Kimura | F16C 17/045 |
| 2020/0278029 | A1 | 9/2020 | Kimura | F16J 15/3452 |
| 2021/0003221 | A1 | 1/2021 | Kimura | F16J 15/34 |

FOREIGN PATENT DOCUMENTS

| | | | |
|---|---|---|---|
| JO | S61206168 | 12/1986 | |
| JP | S57154562 | 9/1982 | |
| JP | S6058897 | 4/1985 | ............ F04D 29/12 |
| JP | S622865 | 1/1987 | |
| JP | H03-68677 U | 7/1991 | |
| JP | H0542281 | 10/1993 | |
| JP | H08334174 | 12/1996 | |
| JP | H09-503276 A | 3/1997 | |
| JP | H10196800 | 7/1998 | |
| JP | 2000310342 | 11/2000 | |
| JP | 2005207520 | 8/2005 | |
| JP | H025654 | 8/2005 | .............. F16J 15/34 |
| JP | 2008-185082 A | 8/2008 | |
| JP | 3155833 U | 12/2009 | |
| JP | 2010112486 | 5/2010 | |
| JP | 2011075102 | 4/2011 | .............. F16J 15/34 |
| JP | 5256524 B2 | 8/2013 | |
| JP | 2017078451 | 1/2017 | .............. F16J 15/34 |
| WO | WO-95-006832 A1 | 3/1995 | |
| WO | WO-2014103631 A1 * | 7/2014 | .......... F16J 15/3412 |
| WO | WO2015108107 | 7/2015 | .............. F16J 15/34 |
| WO | WO2016085673 | 6/2016 | |
| WO | WO-2016-129553 A1 | 8/2016 | |

OTHER PUBLICATIONS

Official Action issued in U.S. Appl. No. 16/488,107, dated Mar. 25, 2022 (16 pgs).

Official Action issued in U.S. Appl. No. 16/488,107, dated Jun. 25, 2022 (11 pgs).

Official Action issued in U.S. Appl. No. 16/647,838, dated Jun. 8, 2021 (13 pgs).

European Official Action issued in related application Serial No. 18758024.6, dated Nov. 26, 2021 (5 pgs).

International Search Report and Written Opinion issued in related PCT Application Serial No. PCT/JP2018/005377, dated Aug. 30, 2018, 14 pgs.

International Preliminary Report on Patentability issued in related PCT Application Serial No. PCT/JP2018/005377, dated Aug. 27, 2019, 5 pgs.

International Search Report and Written Opinion issued in related PCT Application Serial No. PCT/JP2018/034533, dated Mar. 28, 2019, 12 pgs.

International Preliminary Report on Patentability issued in related PCT Application Serial No. PCT/JP2018/034533, dated Mar. 24, 2020, 5 pgs.

Office Action issued in U.S. Appl. No. 16/967,399, dated Jun. 23, 2022, (7 pgs).

Office Action issued in U.S. Appl. No. 16/967,399, dated Dec. 23, 2021, (6 pgs).

European Search Report issued in EP 19757853.7 dated Oct. 19, 2021, (7 pgs).

Japanese Official Action issued in related application Serial No. 2020-501760, dated Jun. 17, 2022 (10 pgs).

Chinese Official Action issued in related application Serial No. 2019800112634.x, dated Apr. 28, 2022 (9 pgs).

International Search Report and Written Opinion issued in related PCT Application Serial No. PCT/JP2019/005941, dated Mar. 13, 2019 ,9 pgs.

International Preliminary Report on Patentability issued in related PCT Application Serial No. PCT/JP2019/005941, dated Aug. 27, 2020, 6 pgs.

U.S. Appl. No. 16/647,838, filed Mar. 16, 2020, Kimura.
U.S. Appl. No. 16/488,107, filed Aug. 22, 2019, Tokunaga.
U.S. Appl. No. 16/967,399, filed Jun. 10, 2020, Kimura.

(56) References Cited

OTHER PUBLICATIONS

Official Action issued in U.S. Appl. No. 16/488,107, dated Sep. 28, 2022 (17 pgs).
Notice of Allowance issued in U.S. Appl. No. 16/967,399, dated Oct. 11, 2022, (7 pgs).
Official Action issued in Chinese Application Serial No. 201980012634.x, dated Nov. 21, 2022 (10 pgs).
Office Action issued in U.S. Appl. No. 16/488,107, dated Jan. 20, 2023 (17 pgs).

* cited by examiner

BASIC CONFIGURATION

FIG. 3B

AT LOW RPM

FIG. 3C

AT HIGH RPM

MECHANICAL SEAL

CROSS REFERENCE TO RELATED APPLICATIONS

This application is a U.S. National Stage Application of International Application No. PCT/JP2017/032182, filed on Sep. 7, 2017, and published in Japanese as WO 2018/051867 on Mar. 22, 2018 and claims priority to Japanese Application No. 2016-179060, filed on Sep. 14, 2016. The entire disclosures of the above applications are incorporated herein by reference.

BACKGROUND

Technical Field

The present invention relates to seal rings that require prevention of leakage of fluid from sliding faces, such as mechanical seals suitable for gearboxes for superchargers and turbochargers or for aircraft engines, or the like.

Related Art

A mechanical seal is evaluated for its performance by its leakage rate, wear rate, and torque. Conventional arts have optimized the sliding material and the sliding face roughness of mechanical seals, thereby enhancing performance and achieving low leakage, long life, and low torque. However, due to growing awareness of environmental problems in recent years, a further improvement in the performance of mechanical seals has been required. Thus, technical development beyond the limits of the conventional arts has been necessary.

Under such circumstances, for example, known are those such as a compressor/drive seal, a turbine seal, and a gearbox seal in an aerospace gas turbine, in an environment where working fluid (e.g. oil) is present on the radially outer side of a rotating-side ring and air is present on the radially inner side, with a plurality of hydro-pads formed on a surface of the rotating-side ring, in which the hydro-pads formed on the rotating-side ring have each an inner edge defining the inner periphery that is substantially equidistant from the axis of rotation, and an outer edge eccentrically defining the outer periphery, so as to cause lift in an eccentric state at the surface of the rotating-side ring (see JP 5256524, for example).

In the conventional art described in 5256524, the rotating-side ring can be provided with surface texture, and a stationary-side ring can be made of carbon that is lower in cost than SiC. However, a metal bellows is provided at the back of the stationary-side ring, and the stationary-side ring is axially pressed by the metal bellows. This structure thus results in being difficult to weld the stationary-side ring and the metal bellows together if the stationary-side ring is made of carbon.

Unfortunately, in the conventional art described in JP 5256524, the stationary-side ring cannot be made of carbon, and must be made of expensive SiC, metal, or the like.

In addition, when the rotating-side ring is made of SiC and the stationary-side ring of metal, sparking occurs when sliding faces directly contact each other.

Furthermore, in the conventional art described in JP 5256524, it does not contrive a way to circumferentially evenly press the stationary-side ring when axially pressing the stationary-side ring, and thus cannot prevent deformation of the sliding face of the stationary-side ring caused due to wear when the stationary-side ring is made of carbon.

It is an object of the present invention to provide a mechanical seal that can achieve two conflicting functions of sealing and lubrication of sliding faces over a long period of time by providing surface texture to a rotating-side ring, manufacturing a stationary-side ring with an inexpensive sliding material, and pressing the stationary-side ring to the sliding face of the rotating-side ring by a circumferentially equal force.

SUMMARY OF THE INVENTION

To attain the above objects, a mechanical seal according to a first aspect of the present invention includes: a pair of seal rings sliding relatively to each other, one of the seal rings being a stationary-side seal ring provided at a housing in a non-rotating state and in an axially movable state, the other seal ring being a rotating-side seal ring fixed to a rotating shaft, the seal rings having respective sliding faces extending radially for sealing sealed fluid against leakage, the sliding face of the rotating-side seal ring being provided with dynamic pressure generation grooves configured to communicate with a circumferential edge on an inner peripheral side of the sliding face and not to communicate with a circumferential edge on an outer peripheral side; a spring provided on a back side of the stationary-side seal ring for pressing the stationary-side seal ring against the sliding face of the rotating-side seal ring; and a spring holder provided between the back side of the stationary-side seal ring and the spring.

According to this aspect, a small gap is formed between the sliding faces of the rotating-side seal ring and the stationary-side seal ring, bringing the sliding faces into a gas lubrication state, and resulting in very low friction. At the same time, the dynamic pressure generation grooves pump gas on the inner peripheral side toward the outer peripheral side, thus preventing fluid on the outer peripheral side from leaking to the inner peripheral side.

The stationary-side seal ring can be manufactured with a relatively inexpensive sliding material such as carbon. The back side of the stationary-side seal ring can be pressed at a wide area and by a circumferentially equal force. Even when the stationary-side seal ring is made of carbon that is relatively susceptible to wear, deformation of the sliding face can be prevented. Thus, a mechanical seal capable of achieving two conflicting functions of sealing and lubrication of sliding faces over a long period of time can be provided.

According to a second aspect of the present invention, in the mechanical seal in the first aspect, the back side of the stationary-side seal ring has a step portion with a radially outer side axially shorter than a radially inner side, the spring holder is substantially L-shaped, and the substantially L-shaped spring holder is provided along an axial surface and a radial surface of the step portion.

According to this aspect, the stationary-side seal ring can be supported with stability, and thus the stationary-side seal ring can be prevented from being radially displaced or vibrating.

According to a third aspect of the present invention, the mechanical seal in the first or second aspect further includes a replaceable cartridge provided to the housing, in which the stationary-side seal ring is axially movably held via the spring and the spring holder on a high-pressure fluid side of the cartridge, and the sliding face of the stationary-side seal ring has an inner diameter set smaller than a diameter of an inner cylindrical portion of the cartridge.

According to this aspect, the sliding area is increased, the balance ratio is reduced to make the mechanical seal the balanced type, and the amount of increase in sliding face pressure caused by pressure is reduced. Thus, the film thickness between the sliding faces becomes larger than the conventional one, being able to prevent damage to the sliding faces.

According to a fourth aspect of the present invention, the mechanical seal in any one of the first to third aspects further includes a rotation prevention means for the stationary-side seal ring provided between an outer peripheral portion of the stationary-side seal ring and an outer cylindrical portion of the cartridge, the rotation prevention means including a rotation prevention portion provided at the outer cylindrical portion of the cartridge, the rotation prevention portion being formed of a material having a higher wear resistance than a material of the stationary-side seal ring, the rotation prevention portion having an axial width set such that even when the stationary-side seal ring axially moves, the outer peripheral portion of the stationary-side seal ring is located inside opposite ends of the rotation prevention portion.

According to this aspect, even when the side of the stationary-side seal ring made of carbon is worn by relative sliding of the rotation prevention portion and the stationary-side seal ring, the wear of the stationary-side seal ring occurs along its entire axial length without causing level difference. Thus, the axial relative movement between the rotation prevention portion and the stationary-side seal ring can be done smoothly.

According to a fifth aspect of the present invention, in the mechanical seal in any one of the first to fourth aspects, the spring is a coiled wave spring.

According to this aspect, stable flection can be provided, and strong spring force can be exerted in a limited space. Consequently, the stationary-side seal ring can be energized in a stable state, and the device can be reduced in size.

According to a sixth aspect of the present invention, in the mechanical seal in any one of the first to fifth aspects, the sliding face of the rotating-side seal ring is provided with at least one fluid introduction groove on a high-pressure fluid side of the dynamic pressure generation grooves.

According to this aspect, at low rpm, fluid on the outer peripheral side can be introduced into the sliding faces to bring the sliding faces into a non-contact state, and at high rpm, fluid between the sliding faces can be blown off by centrifugal force to eliminate the effect of the fluid.

According to a seventh aspect of the present invention, in the mechanical seal in any one of the first to sixth aspects, the rotating-side seal ring is pinched and fixed between a step formed at the rotating shaft and an end face of a sleeve fitted on the rotating shaft, the sliding face side of the rotating-side seal ring is provided with an annular groove with a radial width extending across a radially outer position of the step at the rotating shaft, a side opposite to the sliding face of the rotating-side seal ring is provided with an annular groove with a radial width extending across a radially outer position of the end face of the sleeve, and inner diameters of the two annular grooves are set substantially the same.

According to this aspect, the rotating-side seal ring can be pinched by an equal force from opposite sides even when the outer diameter of a large-diameter portion of the rotating shaft is different from the outer diameter of the sleeve (when they are the same, it is a matter of course), and occurrence of distortion of the sliding face of the rotating-side seal ring can be prevented.

Effect of the Invention

The present invention achieves the following outstanding effects.

(1) The sliding face of the rotating-side seal ring is provided with the dynamic pressure generation grooves configured to communicate with the circumferential edge on the inner peripheral side of the sliding face and not to communicate with the circumferential edge on the outer peripheral side. The spring to press the stationary-side seal ring against the sliding face of the rotating-side seal ring is provided on the back side of the stationary-side seal ring. The spring holder is provided between the back side of the stationary-side seal ring and the spring. Consequently, a small gap is formed between the sliding faces of the rotating-side seal ring and the stationary-side seal ring, bringing the sliding faces into a gas lubrication state, and resulting in very low friction. At the same time, the dynamic pressure generation grooves pump gas on the inner peripheral side toward the outer peripheral side, so that fluid on the outer peripheral side is prevented from leaking to the inner peripheral side.

The stationary-side seal ring can be manufactured with a relatively inexpensive sliding material such as carbon. The back side of the stationary-side seal ring can be pressed at a wide area and by a circumferentially equal force. Even when the stationary-side seal ring is made of carbon that is relatively susceptible to wear, deformation of the sliding face can be prevented. Thus, a mechanical seal capable of achieving two conflicting functions of sealing and lubrication of sliding faces over a long period of time can be provided.

(2) The back side of the stationary-side seal ring has the step portion with the radially outer axially shorter than the radially inner side. The spring holder is substantially L-shaped. The substantially L-shaped spring holder is provided along the axial surface and the radial surface of the step portion. Consequently, the stationary-side seal ring can be supported with stability, and the stationary-side seal ring can be prevented from being radially displaced or vibrating.

(3) The replaceable cartridge is provided to the housing. The stationary-side seal ring is axially movably held via the spring and the spring holder on the high-pressure fluid side of the cartridge. The inner diameter of the sliding face of the stationary-side seal ring is set smaller than the diameter of the inner cylindrical portion of the cartridge. Consequently, the sliding area is increased, the balance ratio is reduced to make the mechanical seal the balanced type, and the amount of increase in sliding face pressure caused by pressure is reduced. Thus, the film thickness between the sliding faces becomes larger than the conventional one, being able to prevent damage to the sliding faces.

(4) The rotation prevention means for the stationary-side seal ring is provided between the outer peripheral portion of the stationary-side seal ring and the outer cylindrical portion of the cartridge. The rotation prevention portion provided at the outer cylindrical portion of the cartridge is formed of a material having a higher wear resistance than the material of the stationary-side seal ring. The axial width of the rotation prevention portion is set such that even when the stationary-side seal ring axially moves, the outer peripheral portion of the stationary-side seal ring is located inside opposite ends of the rotation prevention portion. Consequently, even when the side of the stationary-side seal ring made of carbon is worn by relative sliding of the rotation prevention portion and the stationary-side seal ring, the wear of the stationary-side seal ring occurs along its entire axial length without causing level difference. Thus, the axial relative movement between the rotation prevention portion and the stationary-side seal ring can be done smoothly.

(5) By being a coiled wave spring, the spring can provide stable flection, and can exert strong spring force in a limited space. Consequently, the stationary-side seal ring can be energized in a stable state, and the device can be reduced in size.

(6) The sliding face of the rotating-side seal ring is provided with the at least one fluid introduction groove on the high-pressure fluid side of the dynamic pressure generation grooves. Consequently, at low rpm, fluid on the outer peripheral side can be introduced into the sliding faces to bring the sliding faces into a non-contact state, and at high rpm, fluid between the sliding faces can be blown off by centrifugal force to eliminate the effect of the fluid.

(7) The rotating-side seal ring is pinched and fixed between the step formed at the rotating shaft and the end face of the sleeve fitted on the rotating shaft. The sliding face side of the rotating-side seal ring is provided with the annular groove with the radial width extending across the radially outer position of the step at the rotating shaft. The side opposite to the sliding face of the rotating-side seal ring is provided with the annular groove with the radial width extending across the radially outer position of the end face of the sleeve. The inner diameters of the two annular grooves are set substantially the same. Consequently, the rotating-side seal ring can be pinched by an equal force from opposite sides even when the outer diameter of the large-diameter portion of the rotating shaft is different from the outer diameter of the sleeve (when they are the same, it is a matter of course), and occurrence of distortion of the sliding face of the rotating-side seal ring can be prevented.

DESCRIPTION OF EMBODIMENTS

Hereinafter with reference to the drawings, modes for carrying out this invention will be described illustratively based on embodiments. However, the dimensions, materials, shapes, relative arrangements, and others of components described in the embodiments are not intended to limit the scope of the present invention only to them unless otherwise described explicitly.

First Embodiment

With reference to FIG. 1 to FIG. 3C, a sliding component according to a first embodiment of the present invention will be described.

The following first embodiment describes a mechanical seal suitable for a supercharger, in which the flow of air between sliding faces of sliding parts is formed from the inner peripheral side to the outer peripheral side as shown by a broken line and an arrow.

In a supercharger, the outer peripheral side of sliding faces is the side of sealed fluid such as air and condensed water (high-pressure side), and the inner peripheral side is the leakage side (low-pressure side).

Figure 1:
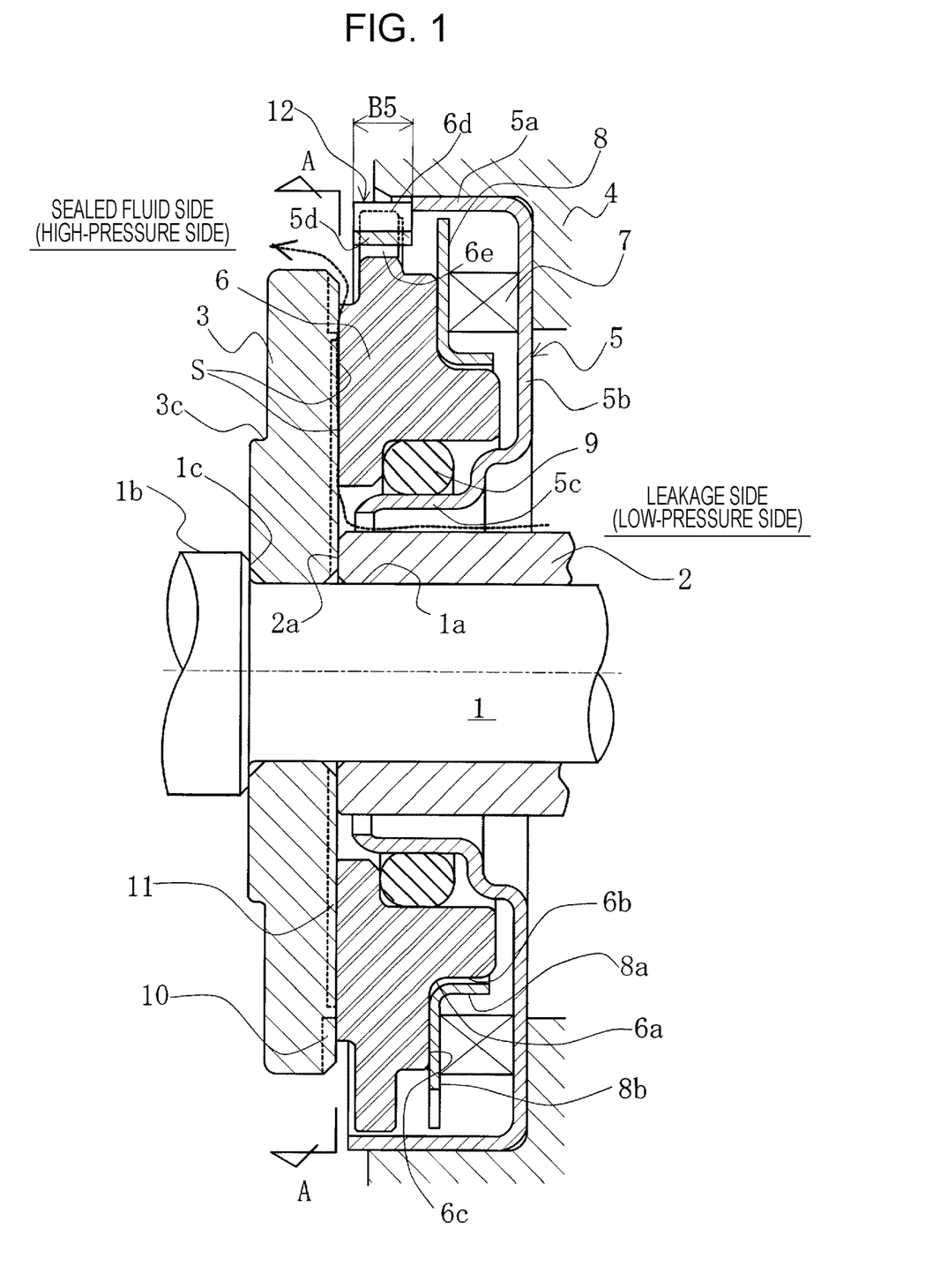
FIG. 1 is a vertical cross-sectional view showing an example of a mechanical seal according to a first embodiment of the present invention.

FIG. 1 is a vertical cross-sectional view showing an example of a mechanical seal applied to a supercharger, which is an inside mechanical seal in the form of sealing sealed fluid such as air and condensed water that tends to leak from the outer periphery toward the inner periphery of sliding faces. The mechanical seal is provided with an annular rotating-side seal ring 3 that is one sliding part provided via a sleeve 2 at a rotating shaft 1 to drive an impeller (not shown) of a compressor provided to the supercharger, in a state of being integrally rotatable with the rotating shaft 1, and an annular stationary-side seal ring 6 that is the other sliding part provided at a housing 4 via a cartridge 5 in a non-rotating state and in an axially movable state. With a coiled wave spring 7 axially urging the stationary-side seal ring 6 via a spring holder 8, the rotating-side seal ring 3 and the stationary-side seal ring 6 slide in close contact with each other at sliding faces S mirror-finished by lapping or the like.

The cartridge 5 is made of metal, for example, and has an outer cylindrical portion 5a fitted into the inner periphery of the housing 4, a disk portion 5b extending radially inward from the leakage side (low-pressure side) of the outer cylindrical portion 5a, and an inner cylindrical portion 5c extending from a radially inner portion of the disk portion 5b toward the high-pressure fluid side along the sleeve 2. The cartridge 5 holds the stationary-side sliding ring 6 axially movably via the coiled wave spring 7 and the spring holder 8 on the high-pressure fluid side in a substantially U-shaped cross section. The cartridge 5 is formed as a replaceable cartridge to the housing 4.

In other words, in this mechanical seal, the rotating-side seal ring 3 and the stationary-side seal ring 6 have the respective sliding faces S extending radially, and prevent sealed fluid, e.g. misty fluid such as air and condensed water (hereinafter, sometimes simply referred to as "fluid") from flowing out from the outer periphery of the sliding faces S to the leakage side on the inner peripheral side at each other's sliding faces S.

Reference numeral 9 denotes an O-ring, which seals a space between the inner cylindrical portion 5c of the cartridge 5 and the stationary-side seal ring 6.

The present example describes a case where the sleeve 2 is formed separately from the rotating-side seal ring 3, which is not limiting. The sleeve 2 may be formed integrally with the rotating-side seal ring 3.

The material of the rotating-side seal ring 3 and the stationary-side seal ring 6 is selected from silicon carbide (SiC) excellent in wear resistance, carbon excellent in self-lubricity, and the like. In the present invention, the sliding face of the rotating-side seal ring 3 can be provided with surface texture since gas is drawn in from the inner peripheral side of the sliding faces (In a type to draw in liquid, only the stationary-side seal ring 6 can be provided with surface texture because if the sliding face of the rotating-side seal ring 3 is provided with surface texture, the liquid is discharged from the sliding face by centrifugal force.). Thus, the stationary-side seal ring 6 need not be provided with surface texture, which allows the stationary-side seal ring 6 to be made of carbon that is lower in cost than SiC.

As shown in FIG. 1, the rotating-side seal ring 3 has an annular shape of a uniform thickness in cross section, and is pinched and fixed between a step 1c between a small-diameter portion 1a and a large-diameter portion 1b of the rotating shaft 1 and an end face 2a of the sleeve 2 fitted on the rotating shaft 1.

The stationary-side seal ring 6 is of a shape having, on its back side in a cross-sectional shape, a step portion 6a with the radially outer side axially shorter than the radially inner side. Specifically, the radially outer side on the back side is of a substantially L-shaped recessed shape, and of a shape such that an axial surface 6b and a radial surface 6c of the step portion 6a are smoothly connected.

The spring holder 8 of a substantially L shape is provided in a portion where the radially outer side on the back side of the stationary-side seal ring 6 is recessed in the substantially L shape. Specifically, an axially extending cylindrical portion 8a of the spring holder 8 extends along the axial surface 6b of the step portion 6a of the stationary-side seal ring 6, and likewise, a radially extending disk portion 8b extends along the radial surface 6c of the step portion 6a of the stationary-side seal ring 6.

The coiled wave spring 7 is provided between the disk portion 8b of the spring holder 8 and the cartridge 5, so as to axially energize the stationary-side seal ring 6 via the spring holder 8.

Since the stationary-side seal ring 6 is pressed against the sliding face S of the rotating-side seal ring 3 via the spring holder 8, the back side of the stationary-side seal ring 6 is pressed at a wide area and by a circumferentially equal force. Consequently, even when the stationary-side seal ring 6 is made of carbon that is relatively susceptible to wear, deformation of its sliding face can be prevented.

Further, since the back side of the stationary-side seal ring 6 is supported on the two surfaces forming the substantially L shape, the stationary-side seal ring 6 can be supported with stability. Thus, the stationary-side seal ring 6 can be prevented from being radially displaced or vibrating.

As shown in FIG. 1, a rotation prevention means 12 for the stationary-side seal ring 6 is provided between an outer peripheral portion 6d of the stationary-side seal ring 6 and the outer cylindrical portion 5a of the cartridge 5. A rotation prevention portion 5d in the rotation prevention means 12 provided at the outer cylindrical portion 5a of the cartridge 5 is formed of a metal material having a higher wear resistance than the material of the stationary-side seal ring 6. The axial width B5 of the rotation prevention portion 5d is set such that even when the stationary-side seal ring 6 axially moves, the outer peripheral portion 6d of the stationary-side seal ring 6 is located inside opposite ends of the rotation prevention portion 5d.

As the rotation prevention means 12, for example, a cutout groove 6e is provided in the outer peripheral portion 6d of the stationary-side seal ring 6 so that the rotation prevention portion 5d provided at the outer cylindrical portion 5a of the cartridge 5 is fitted into the cutout groove 6e. The axial width B5 of the rotation prevention portion 5d is set sufficiently larger than the axial width of the outer peripheral portion 6d of the stationary-side seal ring 6. Thus, even when the stationary-side seal ring 6 axially moves, the outer peripheral portion 6d of the stationary-side seal ring 6 is located inside opposite ends of the rotation prevention portion 5d. Consequently, even when the cutout groove 6e side of the stationary-side seal ring 6 made of carbon is worn by relative sliding of the rotation prevention portion 5d and the cutout groove 6e, the wear of the cutout groove 6e occurs along the entire axial length without causing level difference. Thus, axial relative movement between the rotation prevention portion 5d and the cutout groove 6e is done smoothly.

Further, as shown in FIG. 1, a step 3c is provided on the back side of the sliding face S of the rotating-side seal ring 3 with the radially outer side smaller in axial length than the radially inner side. The step 3c is intended to eliminate the need for major changes in an existing apparatus when the present mechanical seal is mounted to the existing apparatus.

Next, with reference to FIG. 2, the sliding face of the sliding face S of the rotating-side seal ring 3 according to the first embodiment of the present invention will be described.

In the present example, the sliding face S of the rotating-side seal ring 3 is provided with six fluid introduction grooves 10 and a plurality of dynamic pressure generation grooves 11.

Since the fluid introduction grooves 10 and the dynamic pressure generation grooves 11 are formed on the sliding face of the rotating-side seal ring 3, the rotating-side seal ring 3 is formed of silicon carbide (SiC), and the stationary-side seal ring 6 is formed of carbon.

Figure 2:
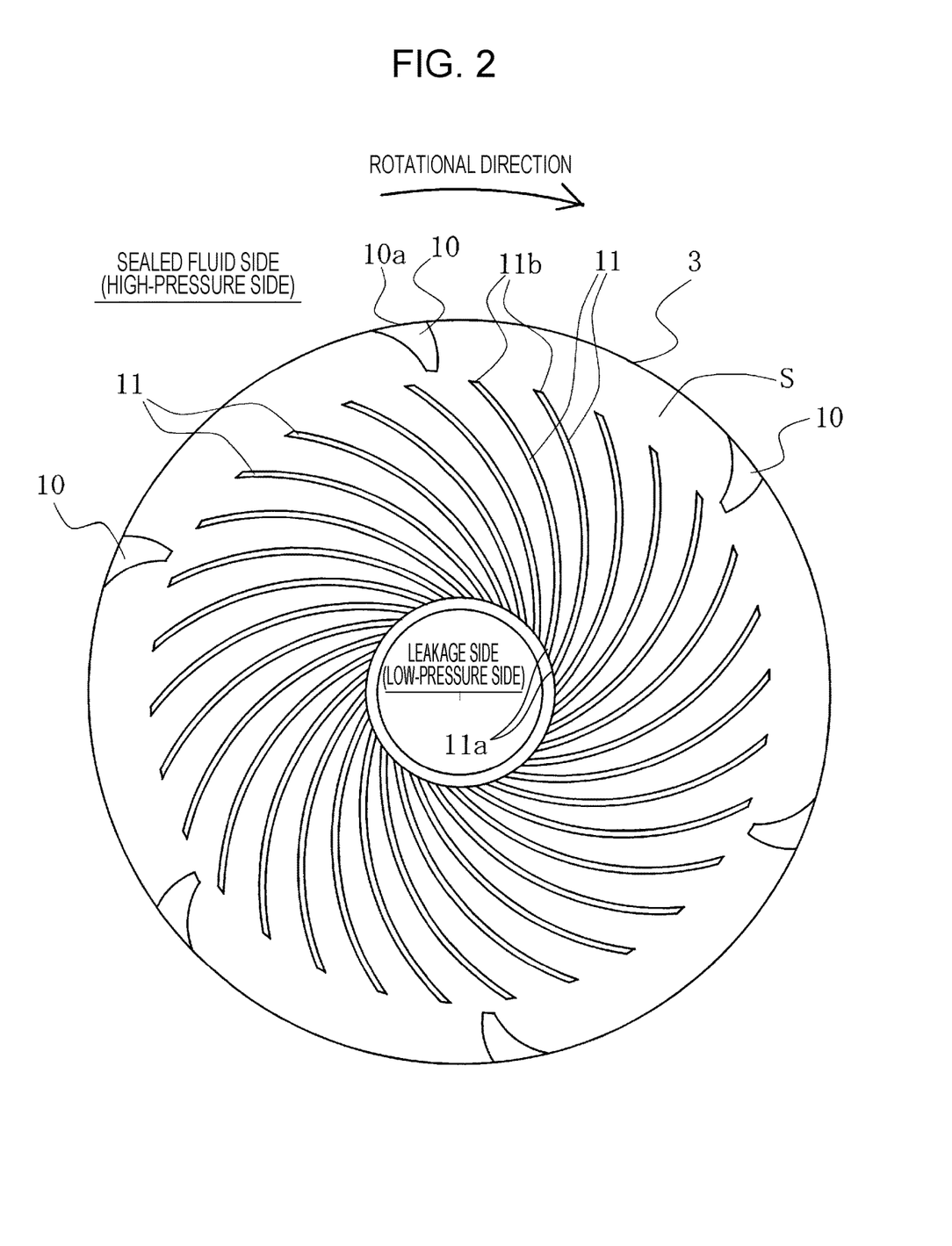
FIG. 2 is a view taken along arrows A-A in FIG. 1.

Suppose that in FIG. 2, the outer peripheral side of the sliding face S of the rotating-side seal ring 3 is the sealed fluid side, the inner peripheral side is the leakage side, e.g. the gas side, and the rotating-side seal ring 3 rotates clockwise as shown by an arrow.

The sliding face S of the rotating-side seal ring 3 is provided with the fluid introduction grooves 10 configured to communicate with the circumferential edge on the sealed fluid side of the sliding face S, that is, on the outer peripheral side thereof, and not to communicate with the circumferential edge on the leakage side thereof, that is, on the inner peripheral side thereof, and is provided with the dynamic pressure generation grooves 11 configured to communicate with the circumferential edge on the inner peripheral side of the sliding face S, and not to communicate with the circumferential edge on the outer peripheral side.

In FIG. 2, each fluid introduction groove 10 has an opening 10a that is open only to the circumferential edge on the outer peripheral side, and is formed in a shape largest at the opening 10a and tapered radially inward. This allows fluid present on the outer peripheral side of the sliding face S to enter the sliding face easily in a low-speed rotation state of the rotating-side seal ring 3 such as at the time of startup, contributing to the lubrication of the sliding face S. Each fluid introduction groove 10 has a shape radially inclined such that a tapered portion is located upstream at the time of rotation and the opening 10a open to the circumferential edge on the outer peripheral side is located downstream. This allows fluid introduced into the sliding face from the fluid introduction grooves 10 to be discharged to the outer peripheral side easily by centrifugal force when the rotating-side seal ring 3 is in a high-speed rotation state such as in normal operation, preventing the fluid from leaking to the inner peripheral side, the leakage side.

In the present example, the six fluid introduction grooves 10 are circumferentially evenly spaced. However, it is only necessary that at least one fluid introduction groove 10 be provided. The fluid introduction grooves 10 are not limited to being evenly spaced.

The dynamic pressure generation grooves 11 are configured to communicate with the circumferential edge on the inner peripheral side of the sliding face S, and not to communicate with the circumferential edge on the outer peripheral side, and have a spiral shape inclined counterclockwise with the inner peripheral side as a starting point. The dynamic pressure generation grooves 11 draw in gas from inlets 11a on the inner peripheral side in a high-speed rotation state of the rotating-side seal ring 3 such as in normal operation, generating dynamic pressure (positive pressure) in the vicinity of ends 11b on the outer peripheral side. This forms a small gap between the sliding faces S of the rotating-side seal ring 3 and the stationary-side seal ring 6, bringing the sliding faces S into a gas lubrication state, and resulting in very low friction. At the same time, the spiral dynamic pressure generation grooves 11 pump gas on the inner peripheral side toward the outer peripheral side, thus preventing liquid on the outer peripheral side from leaking to the inner peripheral side. The spiral dynamic pressure generation grooves 11 are separated from the outer peripheral side by a land R, and thus leakage does not occur during rest.

In the present example, the plurality of spiral dynamic pressure generation grooves 11 is arranged circumferentially not to interfere with the fluid introduction grooves 10. This arrangement form is determined in design by taking operating conditions and the like into consideration.

The fluid introduction grooves 10 are desirably set such that each is opened largely to the outer peripheral side (liquid side) to the extent possible without interference with dynamic pressure generation by the dynamic pressure generation grooves 11, and has a shape to accelerate the introduction of fluid, such as a substantially right triangular shape or a crescent shape, with a portion corresponding to the base being opened to the outer peripheral side, the short side perpendicular to the base being located upstream at the time of rotation and extending radially inward, and the oblique side being inclined downstream at the time of rotation to the outer peripheral side.

The depth of the fluid introduction grooves 10 is set sufficiently deeper than the depth of the dynamic pressure generation grooves 11, and is set to about 25 μm to 500 μm, for example.

Here, with reference to FIGS. 3A to 3C, states of the sliding face in the first embodiment will be described in an easy-to-understand manner.

Figures 3A, 3B, 3C:
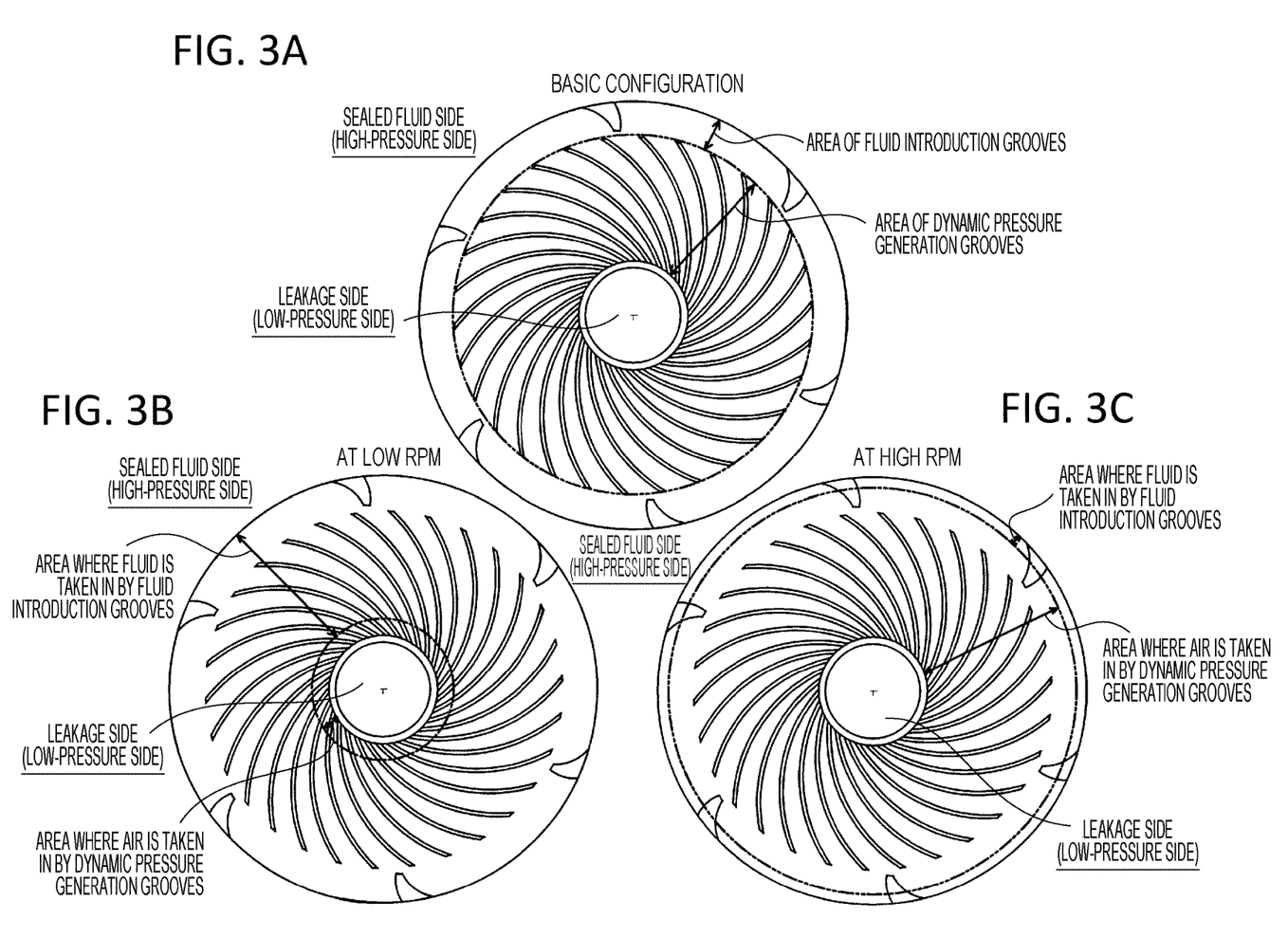
FIGS. 3A to 3C are explanatory diagrams each illustrating a state of a sliding face in the first embodiment in an easy-to-understand manner.

FIG. 3A is a basic configuration diagram illustrating the functions of fluid introduction grooves and dynamic pressure generation grooves on a sliding face provided with the fluid introduction grooves and the dynamic pressure generation grooves.

Suppose that sealed fluid is present on the outer peripheral side of the sliding face, and gas on the leakage side on the inner peripheral side, for example. The fluid introduction grooves have the function of, at low rpm, introducing the fluid on the outer peripheral side into the sliding faces to bring the sliding faces into a non-contact state, and at high rpm, blowing off the fluid between the sliding faces by centrifugal force to eliminate the effect of the fluid.

On the other hand, the dynamic pressure generation grooves have the function of, at low rpm, preventing leakage from the outer peripheral side to the inner peripheral side, and at high rpm, drawing in the gas on the inner peripheral side to bring the sliding faces into a non-contact state, and a gas seal mechanism.

FIG. 3B is a diagram illustrating the state at low rpm. In this state, the fluid introduction grooves introduce the fluid on the outer peripheral side into the sliding faces, keeping the sliding faces in a non-contact state due to fluid lubrication action, while on the inner peripheral side, generated dynamic pressure is small and thus the gas is not sufficiently taken in. However, leakage to the inner peripheral side is prevented.

FIG. 3C is a diagram illustrating the state at high rpm. Since the fluid introduced into the sliding faces is blown off to the outer peripheral side by centrifugal force, fluid lubrication action by the fluid between the sliding faces is eliminated. Meanwhile, on the inner peripheral side, generated dynamic pressure is large, and thus the gas is sufficiently taken in, maintaining the sliding faces in a non-contact state, and the fluid on the outer peripheral side does not leak to the inner peripheral side due to increased pressure at the sliding faces. The sliding faces are in a so-called gas seal state.

The above-described configuration of the first embodiment achieves the following effects.

(1) The sliding face S of the rotating-side seal ring 3 is provided with the dynamic pressure generation grooves 11 configured to communicate with the circumferential edge on the inner peripheral side of the sliding face S and not to communicate with the circumferential edge on the outer peripheral side. The spring 7 to press the stationary-side seal ring 6 against the sliding face S of the rotating-side seal ring 3 is provided on the back side of the stationary-side seal ring 6. The spring holder 8 is provided between the back side of the stationary-side seal ring 6 and the spring 7. Consequently, a small gap is formed between the sliding faces S of the rotating-side seal ring 3 and the stationary-side seal ring 6, bringing the sliding faces into a fluid lubrication state, and resulting in very low friction. At the same time, the dynamic pressure generation grooves 11 pump gas on the inner peripheral side toward the outer peripheral side, so that fluid on the outer peripheral side is prevented from leaking to the inner peripheral side.

The stationary-side seal ring 6 can be manufactured with a relatively inexpensive sliding material such as carbon. The back side of the stationary-side seal ring 6 can be pressed at a wide area and by a circumferentially equal force. Even when the stationary-side seal ring 6 is made of carbon that is relatively susceptible to wear, deformation of the sliding face can be prevented. Thus, a mechanical seal capable of achieving two conflicting functions of sealing and lubrication of sliding faces over a long period of time can be provided.

(2) The back side of the stationary-side seal ring 6 has the step portion 6a with the radially outer side axially shorter than the radially inner side. The spring holder 8 is substantially L-shaped. The substantially L-shaped spring holder 8 is provided along the axial surface 6b and the radial surface 6c of the step portion 6a. Consequently, the stationary-side seal ring 6 can be supported with stability, and the stationary-side seal ring 6 can be prevented from being radially displaced or vibrating.

(3) The rotation prevention means 12 for the stationary-side seal ring 6 is provided between the outer peripheral portion 6d of the stationary-side seal ring 6 and the outer cylindrical portion 5a of the cartridge 5. The rotation prevention portion 5d provided at the outer cylindrical portion 5a of the cartridge 5 is formed of a material having a higher wear resistance than the material of the stationary-side seal ring 6. The axial width B5 of the rotation prevention portion 5d is set such that even when the stationary-side seal ring 6 axially moves, the outer peripheral portion 6d of the stationary-side seal ring 6 is located inside opposite ends of the rotation prevention portion 5d. Consequently, even when the side of the cutout groove 6e of the stationary-side seal ring 6 made of carbon is worn by relative sliding of the rotation prevention portion 5d and the cutout groove 6e, the wear of the cutout groove 6e occurs along its entire axial length without causing level difference. Thus, the axial relative movement between the rotation prevention portion 5d and the cutout groove 6e can be done smoothly.

(4) By being a coiled wave spring, the spring can provide stable flection, and can exert strong spring force in a limited space. Consequently, the stationary-side seal ring 6 can be energized in a stable state, and the device can be reduced in size.

(5) The fluid introduction grooves 10 are provided on the high-pressure fluid side of the dynamic pressure generation grooves 11 on the sliding face S of the rotating-side seal ring 3. Consequently, at low rpm, fluid on the outer peripheral side can be introduced into the sliding faces S to bring the sliding faces S into a non-contact state, and at high rpm, fluid between the sliding faces S can be blown off by centrifugal force to eliminate the effect of the fluid.

Second Embodiment

Figure 4:
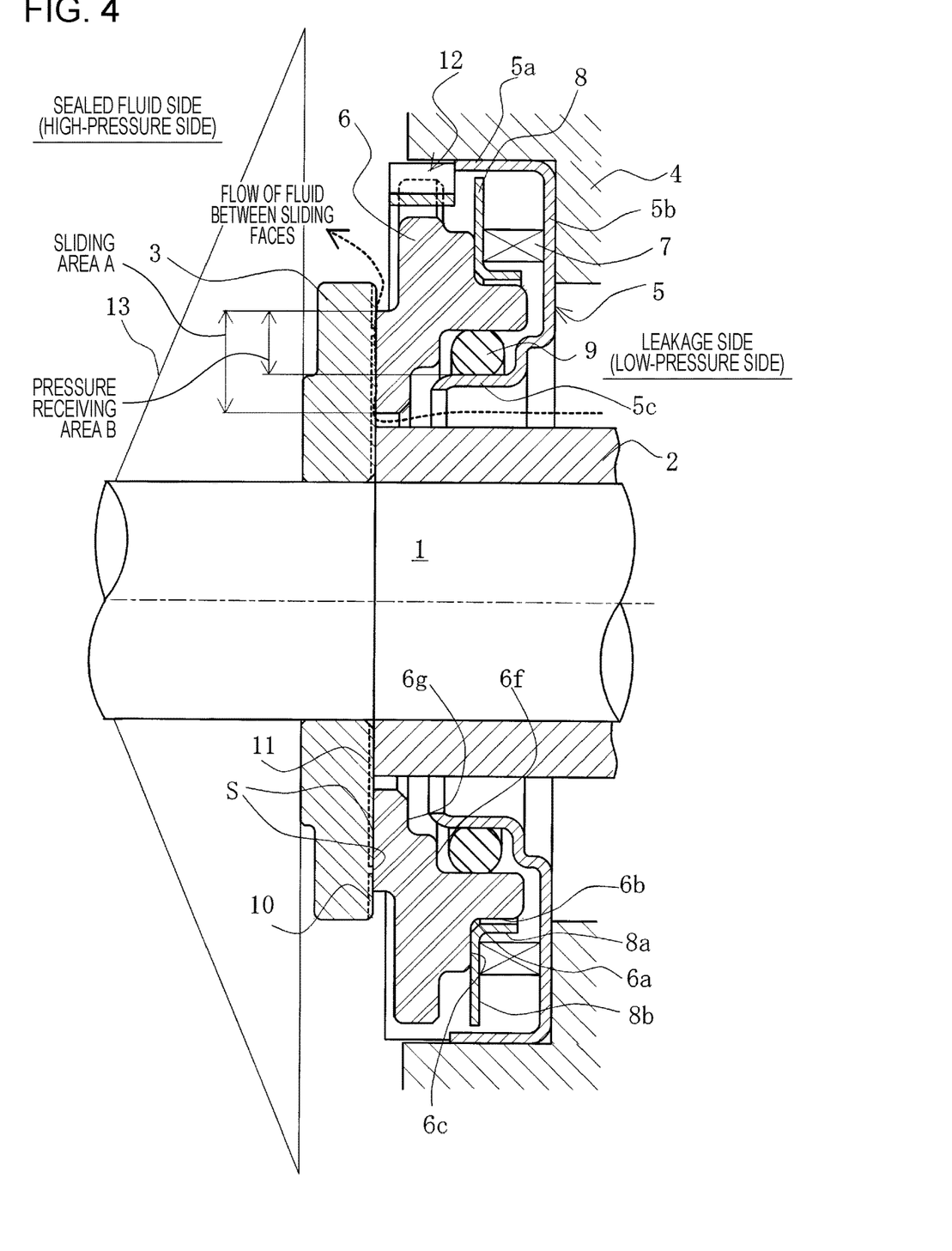
FIG. 4 is a vertical cross-sectional view showing an example of a mechanical seal according to a second embodiment of the present invention.

With reference to FIG. 4, a sliding component according to a second embodiment of the present invention will be described.

The sliding component according to the second embodiment is different from the sliding component in the first embodiment in that the inner diameter of a sliding face S of a stationary-side seal ring 6 is set smaller than the diameter of an inner cylindrical portion 5c of a cartridge 5, but in the other basic configuration, is identical to that of the first embodiment. The same reference symbols are assigned to the same members without duplicated explanation.

In FIG. 4, the inner diameter of the sliding face S of the stationary-side seal ring 6 is set smaller than the diameter of the inner cylindrical portion 5c of the cartridge 5.

This is intended to increase a sliding area to reduce a balance ratio.

Balance ratio K is expressed by K=pressure receiving area B/sliding area A.

Generally, when K=1.1 to 1.3, it is called an unbalanced type, and when K=0.7 to 1.0, a balanced type.

An impeller 13 for supercharging is provided at the back of a rotating-side seal ring 3.

A supercharger in the present embodiment has conventionally adopted the unbalanced type, in which the amount of increase in sliding face pressure caused by fluid pressure is larger than that of the balanced type. The larger the sliding face pressure, the smaller the effect of dynamic pressure generation grooves. The effect of the dynamic pressure generation grooves also becomes smaller at low rpm (in a state where the relative sliding speed of sliding faces is low). Consequently, a sufficient fluid film thickness cannot be provided between the sliding faces, and the sliding faces can be damaged.

In contrast, by increasing the sliding area to reduce the balance ratio to make the mechanical seal the balanced type, the amount of increase in sliding face pressure caused by the pressure of sealed fluid is reduced, and the film thickness between the sliding faces becomes larger than that of the conventional unbalanced type. Thus, the film thickness also becomes larger at low rpm, and the sliding faces become resistant to damage.

To increase the sliding area, in FIG. 4, in a cross-sectional shape of the stationary-side seal ring 6, a recess 6g to avoid the inner cylindrical portion 5c of the cartridge 5 is provided on the radially inner side of a recess 6f to fit an O-ring 9 provided on the radially inner side of the back side of the stationary-side seal ring 6, and the inner periphery of the sliding face S of the stationary-side seal ring 6 is located closer to the radially inner side than the inner cylindrical portion 5c of the cartridge 5.

When the axial length of the inner cylindrical portion 5c of the cartridge 5 can be shortened, the recess 6g does not necessarily need to be provided.

Figure 5:
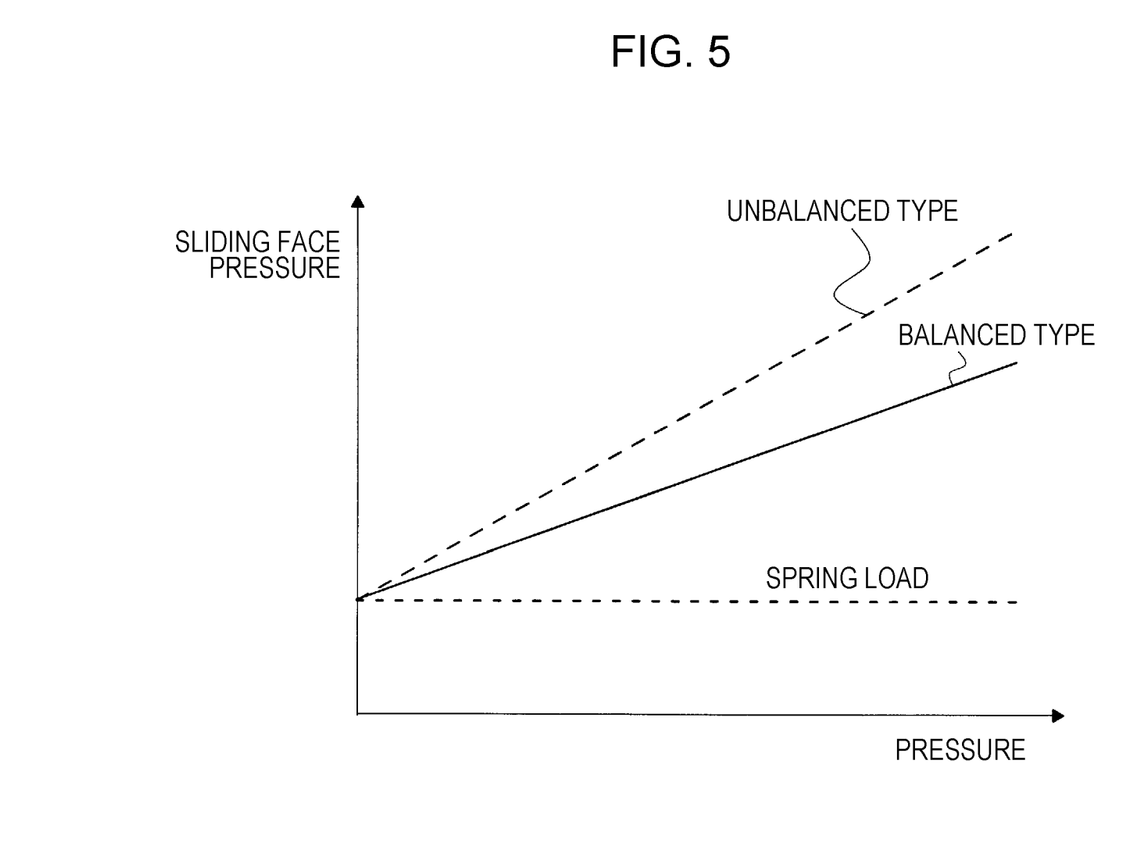
FIG. 5 is an explanatory diagram illustrating sliding face pressure in an unbalanced type and a balanced type of mechanical seal.

FIG. 5 is an explanatory diagram illustrating sliding face pressure in the unbalanced type and the balanced type of mechanical seal.

As shown in FIG. 5, the balanced type is smaller in the amount of increase in sliding face pressure caused by the pressure of sealed fluid than the unbalanced type. Consequently, the film thickness between the sliding faces becomes larger, the film thickness also becomes larger at low rpm, and the sliding faces become resistant to damage.

The above-described configuration of the second embodiment achieves the following effects in addition to the effects of the first embodiment.

(1) The replaceable cartridge 5 is provided to the housing 4. The stationary-side seal ring 6 is axially movably held via the spring and the spring holder on the high-pressure fluid side of the cartridge 5. The inner diameter of the sliding face S of the stationary-side seal ring 6 is set smaller than the diameter of the inner cylindrical portion 5a of the cartridge 5. Consequently, the sliding area is increased, the balance ratio is reduced to make the mechanical seal the balanced type, and the amount of increase in sliding face pressure caused by pressure is reduced. Thus, the film thickness between the sliding faces becomes larger than the conventional one, being able to prevent damage to the sliding faces.

Third Embodiment

Figure 6:
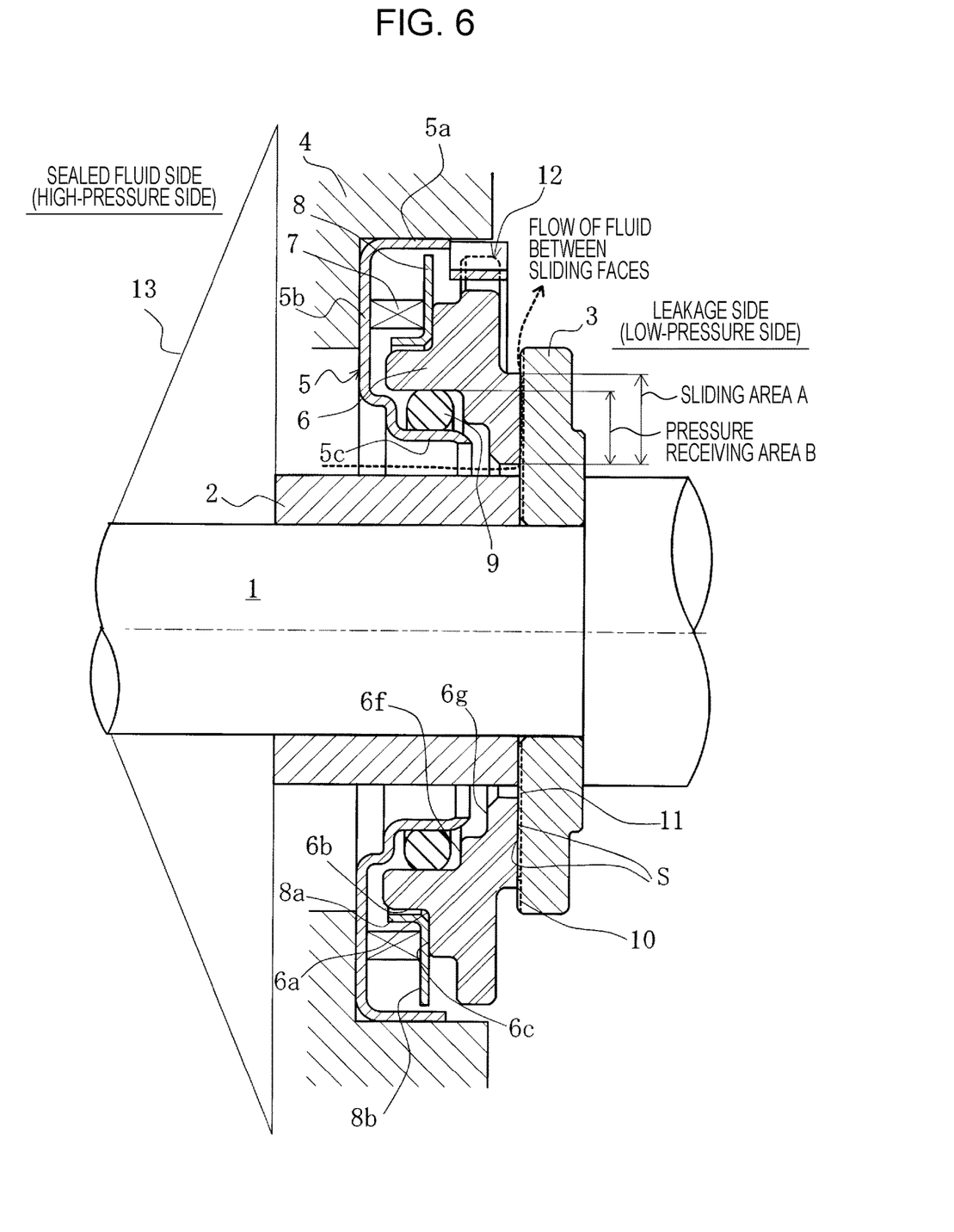
FIG. 6 is a vertical cross-sectional view showing an example of a mechanical seal according to a third embodiment of the present invention.

With reference to FIG. 6, a sliding component according to a third embodiment of the present invention will be described.

The sliding component in the third embodiment is different from that of the second embodiment in that it is a mechanical seal suitable for a turbocharger, but in the other basic configuration, is identical to that of the second embodiment. The same reference symbols are assigned to the same members without duplicated explanation.

In a turbocharger, the outer peripheral side is the side of liquid such as oil (low-pressure side) on which a thrust bearing or the like is mounted, and the inner peripheral side is the sealed fluid side (high-pressure side) for supercharging air and condensed water or the like to a combustion chamber. The difference from the second embodiment is that when negative pressure is generated on the sealed fluid side, it is necessary to prevent oil on the outer peripheral side from leaking out to the inner peripheral side. However, the flow of air between sliding faces of sliding parts is formed from the inner peripheral side to the outer peripheral side as shown by a broken line and an arrow, which point is common to the second embodiment.

In FIG. 6, a cartridge 5 is provided on the sealed fluid side, and holds a stationary-side sliding ring 6 axially movably via a coiled wave spring 7 and a spring holder 8 on the liquid side (low-pressure side) in a substantially U-shaped cross section of the cartridge 5. A rotating-side seal ring 3 is provided on the liquid side (low-pressure side) to face the stationary-side seal ring 6.

An impeller 13 for supercharging is provided on the sealed fluid side.

In FIG. 6, the inner diameter of a sliding face S of the stationary-side seal ring 6 is set smaller than the diameter of an inner cylindrical portion 5c of the cartridge 5 as in the second embodiment (FIG. 4).

This is intended to increase a pressure receiving area to increase the amount of increase in sliding face pressure caused by pressure, thereby to reduce the load of the spring to reduce torque at the time of startup.

The turbocharger in the present embodiment has had a small pressure receiving area and a small amount of increase in sliding face pressure caused by fluid pressure, and has required a corresponding increase in spring load. An increased spring load results in increasing sliding torque at the time of startup, although during rotation, sliding torque is reduced by the effect of dynamic pressure generation grooves.

In contrast, by increasing the pressure receiving area, the amount of increase in sliding face pressure caused by pressure is increased. Thus, the spring load can be decreased, and the torque at the time of startup can be reduced.

To increase the pressure receiving area, in FIG. 5, in a cross-sectional shape of the stationary-side seal ring 6, a recess 6g to avoid the inner cylindrical portion 5c of the cartridge 5 is provided on the radially inner side of a recess 6f to fit an O-ring 9 provided on the radially inner side of the back side, and the inner periphery of the sliding face S of the stationary-side seal ring 6 is located closer to the radially inner side of the inner cylindrical portion 5c of the cartridge 5.

When the axial length of the inner cylindrical portion 5c of the cartridge 5 can be shortened, the recess 6g does not necessarily need to be provided.

The above-described configuration of the third embodiment achieves the following effects in addition to the effects of the first embodiment.

(1) The replaceable cartridge 5 is provided to the housing 4. The stationary-side seal ring 6 is axially movably held via the spring and the spring holder on the high-pressure fluid side of the cartridge 5. The inner diameter of the sliding face S of the stationary-side seal ring 6 is set smaller than the diameter of the inner cylindrical portion 5a of the cartridge 5. Consequently, the pressure receiving area is increased, and the amount of increase in sliding face pressure caused by pressure is increased. Thus, the spring load can be decreased, and the torque at the time of startup can be reduced.

Fourth Embodiment

Figure 7:
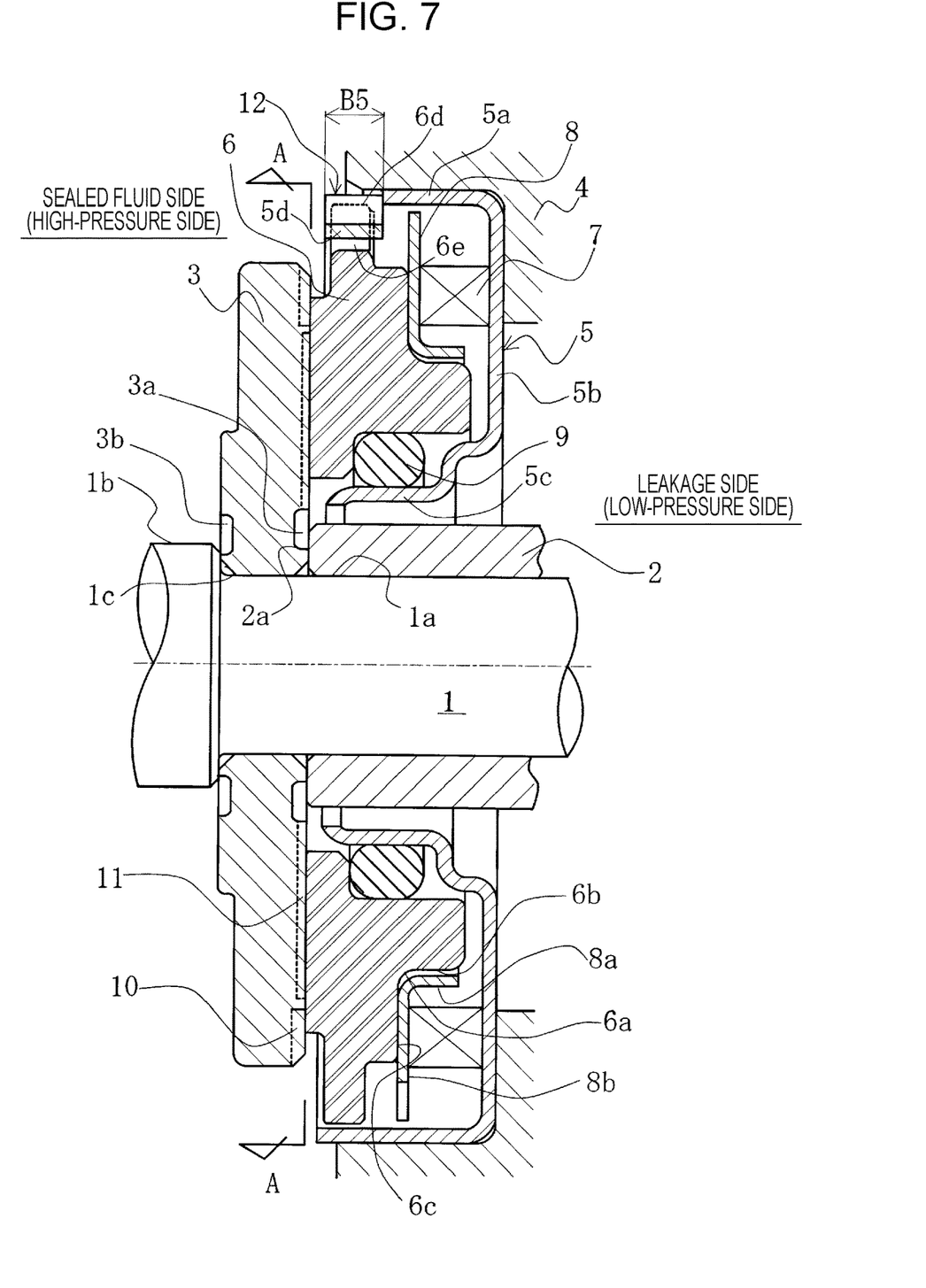
FIG. 7 is a vertical cross-sectional view showing an example of a mechanical seal according to a fourth embodiment of the present invention.
Figure 8A:
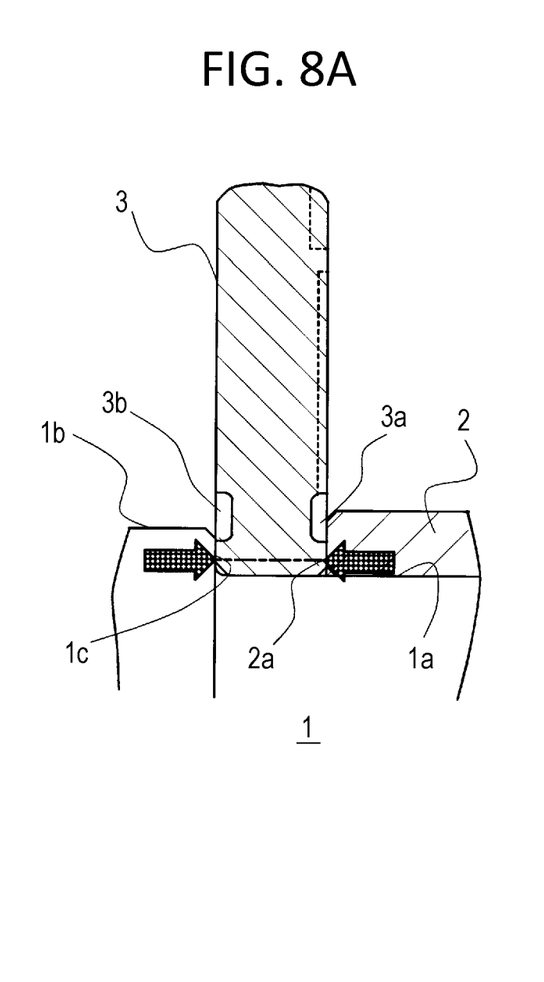
FIGS. 8A and 8B are diagrams illustrating a principal part of the fourth embodiment of the present invention.
Figure 8B:
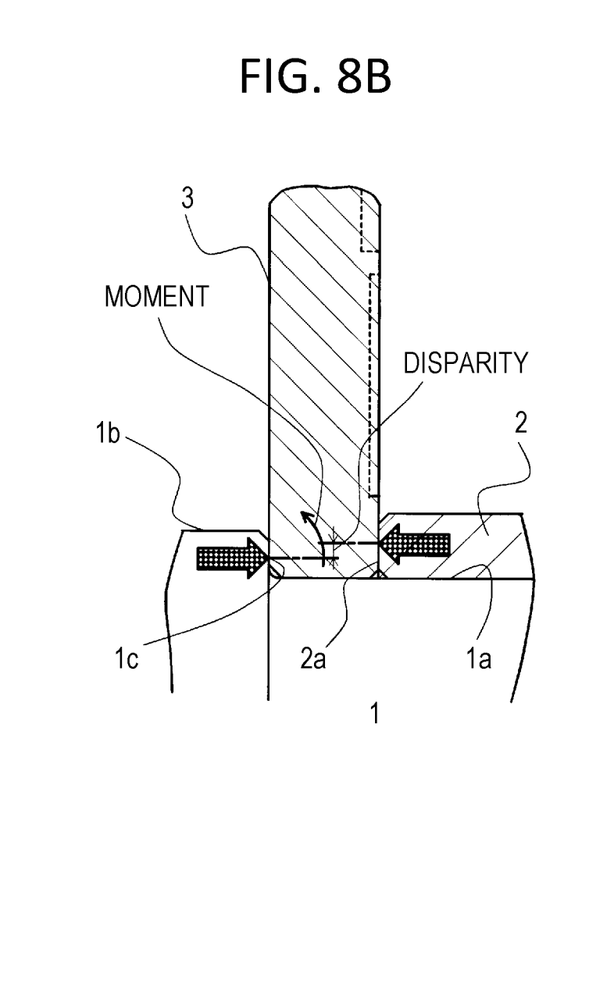

With reference to FIG. 7 to FIG. 8B, a mechanical seal according to a second embodiment of the present invention will be described.

The mechanical seal according to the second embodiment is different from the mechanical seal in the first embodiment in that a rotating-side seal ring 3 is provided with annular grooves, but in the other basic configuration, is identical to that of the first embodiment. The same reference symbols are assigned to the same members without duplicated explanation.

As shown in FIG. 7, the rotating-side seal ring 3 is pinched and fixed between a step 1c between a small-diameter portion 1a and a large-diameter portion 1b of a rotating shaft 1 and an end face 2a of a sleeve 2 fitted on the rotating shaft 1. The side of the sliding face S of the rotating-side seal ring 3 is oppose the end face 2a of the sleeve 2.

The side of the sliding face S of the rotating-side seal ring 3 is provided with an annular groove 3a with a radial width extending across the radially outer position of the end face 2a of the sleeve 2. The side opposite to the sliding face of the rotating-side seal ring 3 is provided with an annular groove 3b with a radial width extending across the radially outer position of the large-diameter portion 1b of the rotating shaft 1. The inner diameters of the two annular grooves 3a and 3b are set substantially the same.

Note that "substantially the same" includes a case where the inner diameters are not exactly the same due to errors in manufacturing or the like, for example, and the inner diameters need not be the same in a strict sense.

The outer diameter of the large-diameter portion 1b of the rotating shaft 1 can be different from the outer diameter of the sleeve 2 in relation to a pump apparatus or the like to which the mechanical seal is mounted.

Now, suppose that the annular grooves 3a and 3b are not provided on the rotating-side seal ring 3 as shown in FIG. 8B. An equal pinching force does not act on opposite sides of the rotating-side seal ring 3. For example, when the outer diameter of the sleeve 2 is larger than the outer diameter of the large-diameter portion 1b of the rotating shaft 1, a moment M tending to bend the rotating-side seal ring 3 toward the large-diameter portion 1b of the rotating shaft 1 acts. This can distort the sliding face S of the rotating-side seal ring 3.

By contrast, as shown in FIG. 8A, when the side of the sliding face S of the rotating-side seal ring 3 is provided with the annular groove 3a with the radial width extending across the radially outer position of the end face 2a of the sleeve 2, the side opposite to the sliding face of the rotating-side seal ring 3 is provided with the annular groove 3b with the radial width extending across the radially outer position of the large-diameter portion 1b of the rotating shaft 1, and the inner diameters of the two annular grooves 3a and 3b are set substantially the same, the rotating-side seal ring 3 can be pinched by an equal force from opposite sides even in a case where the outer diameter of the large-diameter portion 1b of the rotating shaft 1 is different from the outer diameter of the sleeve 2 (when they are the same, it is a matter of course). Thus, no bending moment acts on the rotating-side seal ring 3.

In addition to the effects of the first embodiment, the above-described configuration of the fourth embodiment allows the rotating-side seal ring 3 to be pinched by an equal force from opposite sides even when the outer diameter of the large-diameter portion 1b of the rotating shaft 1 is different from the outer diameter of the sleeve 2 (when they are the same, it is a matter of course), and can prevent occurrence of distortion of the sliding face S of the rotating-side seal ring 3.

Although the embodiments of the present invention have been described above with reference to the drawings, a specific configuration thereof is not limited to these embodiments. Any changes and additions made without departing from the scope of the present invention are included in the present invention.

For example, although the first and second embodiments have described the case where the mechanical seal is applied to a supercharger, and the third embodiment has described the case where the mechanical seal is applied to a turbocharger, the present invention is not limited to them, and is applicable to any one in which the flow of air between sliding faces of sliding parts is formed from the inner peripheral side to the outer peripheral side.

Further, for example, the above embodiments have described the spiral dynamic pressure generation grooves 11 as the dynamic pressure generation grooves, but this is not limiting. The dynamic pressure generation grooves may be Rayleigh step mechanisms with Rayleigh steps, or herringbone grooves. It is essential only that the dynamic pressure generation grooves be mechanisms that draw in fluid from the leakage side and generate positive pressure.

The invention claimed is:

1. A mechanical seal comprising:
a pair of seal rings sliding relatively to each other, a first one of the pair of seal rings being a stationary-side seal ring provided at a housing via a cartridge in a non-rotating state and in an axially movable state, a second one of the pair of seal rings being a rotating-side seal ring fixed to a rotating shaft, the seal rings having respective sliding faces extending radially for sealing sealed fluid against leakage;
wherein the cartridge has an outer cylindrical portion fitted into an inner periphery of the housing, a disk portion extending radially inward from one end of the outer cylindrical portion at an opposite side of the sliding face of the stationary-side seal ring, and an inner cylindrical portion extending from a radially inner portion of the disk portion in an axial direction;
a spring provided between the stationary-side seal ring and the disk portion of the cartridge and configured for pressing the stationary-side seal ring against the sliding face of the rotating-side seal ring; and
a spring holder provided between the stationary-side seal ring and the spring,
wherein the stationary-side seal ring has a step portion radially outward on the opposite side of the sliding face, wherein the step portion is a recess with a substantially L-shaped cross section and is provided with an axial peripheral surface and a radial surface,
wherein the spring holder has a substantially L-shaped cross section and is provided with a cylindrical portion and a disk portion,
the cylindrical portion is disposed along the axial peripheral surface,
the disk portion is disposed on the radial surface,
wherein dynamic pressure generation grooves are provided on the sliding face of the rotating-side seal ring, communicate with a circumferential edge on an inner peripheral side of the sliding face and do not communicate with a circumferential edge on an outer peripheral side of the sliding face,
at least one fluid introduction groove is provided on the outer peripheral side of the sliding face, and
the at least one fluid introduction groove has an opening that is open only to the circumferential edge on the outer peripheral side of the sliding face and has a shape largest at the opening and tapered radially inward, and
the at least one fluid introduction groove is radially inclined such that:
a tapered portion of the at least one fluid introduction groove is located upstream at a time of rotation; and
the opening of the at least one fluid introduction groove is located downstream at the time of rotation,
wherein a rotation prevention portion for the stationary-side seal ring is provided within the outer most portion of the cartridge which is fitted into the inner periphery of the housing in the axial direction:
the outer peripheral portion of the stationary-side seal ring being provided with a cutout groove, and the axial width of the rotation prevention portion is set sufficiently longer than the axial width of the cutout groove of the stationary-side ring, so that the rotation prevention portion is able to contact entirely the axial width of the cutout groove of the stationary-side ring,
and the rotation prevention portion being movable relative to the cutout groove in the radial direction and also the axial direction, and the rotation prevention portion preventing for the rotation of the stationary-side seal ring in the peripheral direction by engaged to the cutout groove,
wherein the rotation prevention portion is formed of a material having a higher wear resistance than a material of the stationary-side seal ring and has an axial width set such that even when the stationary-side seal ring axially moves, the outer peripheral portion of the stationary-side seal ring is located inside opposite ends of the rotation prevention portion, and
wherein the sliding face of the stationary-side seal ring has an inner diameter set smaller than a diameter of an inner cylindrical portion of the cartridge.

2. The mechanical seal according to claim 1, wherein the spring is a coiled wave spring.

3. The mechanical seal according to claim 1, wherein the rotating-side seal ring is pinched and fixed between a step formed at the rotating shaft and an end face of a sleeve fitted on the rotating shaft,
the sliding face side of the rotating-side seal ring is provided with an annular groove with a radial width extending across a radially outer position of the step at the rotating shaft,
a side opposite to the sliding face of the rotating-side seal ring is provided with an annular groove with a radial width extending across a radially outer position of the end face of the sleeve, and
inner diameters of the two annular grooves are set substantially the same.

* * * * *